(12) United States Patent
Spencer et al.

(10) Patent No.: US 12,085,536 B2
(45) Date of Patent: Sep. 10, 2024

(54) UTILITY POLE MONITORING SYSTEM AND DEVICE

(71) Applicant: Structural Lines Party Limited, Darra (AU)

(72) Inventors: Nathan Spencer, Darra (AU); Abbas Zahedi Kouzani, Waurn Ponds (AU); Michael John Norton, Waurn Ponds (AU); Sui Yang Khoo, Waurn Ponds (AU); Tianhao Wu, Waurn Ponds (AU); Russell Graeme Oliver, Waurn Ponds (AU); Aidin Farzaneh, Waurn Ponds (AU); Nathan Ian Semianiw, Waurn Ponds (AU)

(73) Assignee: Structural Lines Party Limited, Darra (AU)

( * ) Notice: Subject to any disclaimer, the term of this patent is extended or adjusted under 35 U.S.C. 154(b) by 390 days.

(21) Appl. No.: 17/278,638

(22) PCT Filed: Sep. 20, 2019

(86) PCT No.: PCT/AU2019/051009
§ 371 (c)(1),
(2) Date: Mar. 22, 2021

(87) PCT Pub. No.: WO2020/061620
PCT Pub. Date: Apr. 2, 2020

(65) Prior Publication Data
US 2022/0034847 A1    Feb. 3, 2022

(30) Foreign Application Priority Data

Sep. 26, 2018 (AU) .............................. 2018903631

(51) Int. Cl.
*G01N 29/04* (2006.01)
*B06B 1/10* (2006.01)
(Continued)

(52) U.S. Cl.
CPC ............. *G01N 29/045* (2013.01); *B06B 1/10* (2013.01); *G01M 5/0066* (2013.01);
(Continued)

(58) Field of Classification Search
CPC ......... B06B 1/10; G01H 1/00; G01M 5/0058; G01M 5/0066; G01M 7/025;
(Continued)

(56) References Cited

U.S. PATENT DOCUMENTS 4,059,988 A    11/1977  Shaw
5,621,172 A     4/1997  Wilson et al.
(Continued)

FOREIGN PATENT DOCUMENTS

JP     2006217704 A  *  8/2006
WO    WO-0229398 A1  *  4/2002   ........... G01N 29/045
(Continued)

*Primary Examiner* — David L Singer
(74) *Attorney, Agent, or Firm* — FisherBroyles, LLP; Cara L. Crowley-Weber; Gregory T. Fettig

(57) ABSTRACT

A utility pole monitoring device comprising: a body adapted to couple to a utility pole, a vibration device arranged on the body and configured to generate vibrations on or in the utility pole, a sensor arranged on the body for measuring the vibrations within the utility pole generated by the vibration device, and a controller for providing an initialization signal to the vibration device, and receive measured data from the sensor.

3 Claims, 13 Drawing Sheets

(51) Int. Cl.
*G01M 5/00* (2006.01)
*G01P 15/09* (2006.01)
*G01W 1/00* (2006.01)

(52) U.S. Cl.
CPC .............. *G01P 15/09* (2013.01); *G01W 1/00* (2013.01); *G01N 2291/023* (2013.01)

(58) Field of Classification Search
CPC ..... G01N 2291/023; G01N 2291/0258; G01N 29/045; G01N 3/34; G01P 15/09; G01W 1/00; H10N 30/00
See application file for complete search history.

(56) References Cited

U.S. PATENT DOCUMENTS

| | | | | |
|---|---|---|---|---|
| 6,347,551 | B1* | 2/2002 | Turpening | G01N 29/223 73/598 |
| 8,941,491 | B2* | 1/2015 | Polk | H04L 12/66 340/539.22 |
| 2008/0255806 | A1* | 10/2008 | Sambuelli | G01N 3/30 702/183 |
| 2008/0289724 | A1* | 11/2008 | Sharplin | G01N 29/225 144/34.1 |
| 2010/0295672 | A1* | 11/2010 | Hyland | H04Q 9/00 340/539.1 |
| 2011/0288777 | A1* | 11/2011 | Gupta | G06Q 10/06311 702/57 |
| 2014/0278150 | A1 | 9/2014 | Baesler et al. | |
| 2015/0355144 | A1 | 12/2015 | Bartuli | |
| 2016/0131358 | A1* | 5/2016 | Spiro | H01F 41/041 455/561 |
| 2016/0313209 | A1* | 10/2016 | Van Zee | G01M 5/0066 |
| 2016/0371657 | A1* | 12/2016 | Butera | G06Q 10/063 |
| 2018/0143237 | A1* | 5/2018 | Beaudet | G01R 31/42 |
| 2018/0156837 | A1* | 6/2018 | Williams | G01P 15/14 |
| 2018/0167131 | A1* | 6/2018 | Liu | B64C 39/024 |
| 2018/0217103 | A1* | 8/2018 | Someda | G01N 29/045 |
| 2018/0375316 | A1* | 12/2018 | Greco | H02G 7/20 |
| 2021/0190848 | A1* | 6/2021 | Boje | G01P 13/00 |

FOREIGN PATENT DOCUMENTS

| | | | | |
|---|---|---|---|---|
| WO | 2011054323 | | 5/2011 | |
| WO | WO-2014075140 | A1* | 5/2014 | .......... G01L 5/0038 |
| WO | WO-2017125730 | A1* | 7/2017 | |
| WO | WO-2017149267 | A1* | 9/2017 | .......... G01M 5/0025 |

* cited by examiner

UTILITY POLE MONITORING SYSTEM AND DEVICE

CROSS-REFERENCE TO RELATED APPLICATIONS

This application is a 35 USC § 371 National Stage application of PCT/AU2019/051009, entitled "Utility Pole Monitoring System and Device," filed Sep. 20, 2019, which claims the benefit of priority to Australian Patent Application Number 2018903631, entitled "Utility Pole Monitoring System and Device," filed Sep. 26, 2018; the contents of which applications are hereby incorporated by reference.

FIELD

The present invention relates to utility pole monitoring systems and devices.

BACKGROUND

A utility pole is a column or post used to support overhead utilities, including but not limited to electrical cable, fiber optic cable, or other communications infrastructure, and related equipment such as transformers and street lights.

Utility poles are routinely inspected to assess the condition of the poles to ensure that each pole can support the equipment mounted thereon. Traditionally, trained inspectors conduct utility pole inspections by performing manual testing procedures reiteratively on each utility pole individually.

Conventional utility pole monitoring systems suffer from several drawbacks. The accuracy of the test procedures depends highly on the experience of the inspector. Furthermore, some utility poles are not readily accessible making manual inspection difficult or impossible. Measurements taken during inspection are captured at the location of the pole and entered into databases individually, often resulting in data entry errors. Conventional systems also do not allow real time monitoring of multiple utility poles.

In this context, there is a need for an improved utility pole monitoring system, or at least a viable alternative.

SUMMARY

According to one aspect of the present invention, there is provided a utility pole monitoring device comprising:
  a body adapted to couple to a utility pole;
  a vibration device arranged on the body and configured to generate vibrations on or in the utility pole;
  a sensor arranged on the body for measuring the vibrations within the utility pole generated by the vibration device; and
  a controller for providing an initialization signal to the vibration device, and receive measured data from the sensor.

The body may be a ring, the ring may comprise a first ring section; a second ring section attached by a hinge to the first ring section; and wherein the first and second ring sections may be hinged open to locate the ring around the utility pole and hinged closed to surround the utility pole.

The vibration device may be an impact unit configured to deliver an impact force to the utility pole.

The impact unit may comprise: a hammer for delivering the impact force to the utility pole; and an actuator for actuating the hammer.

The actuator may be a motor. The impact unit may comprise: a shaft attached to the hammer, forming a pivot for the hammer; a spring, attached to the shaft to bias the hammer toward a striking position; a cam arranged between the shaft and the motor, wherein rotation of the motor causes rotation of the cam and the shaft, actuating the hammer away from the striking position; and wherein, when the cam releases the shaft, the spring biases the shaft to pivot the hammer toward the striking position.

The vibration device may be a non-impact unit comprising an off-balance cam configured to vibrate when in rotations; and an actuator for rotating the off-balance cam.

The sensor may be an accelerometer. The accelerometer may be a piezo-ceramic accelerometer.

The utility pole monitoring device may comprise a transmitter. The transmitter may be transceiver. The transmitter may be configured to transmit the measured data.

The utility pole monitoring device may comprise a wind sensor. The wind sensor may be a pressure sensor.

The utility pole monitoring device may comprise an inertial measurement unit configured to detect deflection of the utility pole.

According to another aspect of the present invention, there is provided a utility pole sensing system comprising:
  a vibration device adapted to couple to the utility pole and configured to generate vibrations on or in the utility pole;
  a sensor for measuring the vibrations in the utility pole generated by the vibration device; and
  a control unit adapted to couple to the utility pole, in communication with the vibration device and the sensor, wherein the control unit is configured to output an initialization signal to the vibration device and receive measured data from the sensor.

The vibration device may be an impact unit configured to deliver an impact force to the utility pole.

The impact unit may comprise: a hammer for delivering the impact force to the utility pole; and an actuator for actuating the hammer.

The sensor may be a piezo ceramic accelerometer.

The utility pole sensing system may comprise a transceiver configured for two-way communication with a remote device.

The utility pole sensing system may comprise a wind sensor unit in communication with the controller.

According to another aspect of the invention there is provided a utility pole monitoring system comprising:
  a plurality of pole sensing systems, each adapted to couple to a respective utility pole, each pole sensing system comprising a sensor for sensing a characteristic of utility pole condition; and
  a remote device in wireless communication with the plurality of pole sensing systems;
  wherein the remote device or one of the pole sensing systems is configured to analyze the sensed characteristic to determine a condition of the utility pole.

The remote device may be a server.

Each pole sensing system may be assigned a unique identifier and may communicate with the remote device using a channel access method.

The utility pole monitoring system may comprise a gateway, wherein the remote device is in wireless communication with each pole sensing system via the gateway.

Each pole sensing device and the gateway may be assigned a unique identifier and wirelessly communicate with the remote device using a channel access method. The channel access method may allocate a time slot to each unique numerical identifier for each device to communicate within the allocated time slot.

Each sensing system may comprise: a control unit configured to receiving measure data from the sensor; and a transmitter controlled by the controller for transmitting measured data to the remote device.

Each sensing system may comprise a vibration device configured to generate vibrations on or in the utility pole; and the sensor may be an accelerometer for measuring the vibrations generated by the vibration device.

The vibration device may be an impact unit configured to deliver an impact force to the utility pole.

The vibration device may be a non-impact unit configured to vibrate against a surface of the utility pole.

The accelerometer may be a piezo ceramic accelerometer.

According to another aspect of the invention there is provided an impact unit for a utility pole sensor system comprising:
- a housing adapted to couple to a utility pole;
- an impact device, housed within the housing configured to deliver an impact force to the utility pole; and
- an actuator housed within the housing and configured to actuate the impact device.

The housing may comprise a faceplate disposed between the impact unit and the utility pole, and wherein the impact unit strikes the faceplate to deliver the impact force to the utility pole.

The actuator may be a motor, and the impact device may be a hammer.

The impact unit may comprise:
- a shaft attached to the hammer, forming a pivot for the hammer;
- a spring, attached to the shaft to bias the hammer toward a striking position;
- a cam arranged between the shaft and the motor, wherein rotation of the motor causes rotation of the cam which winds and releases the shaft, actuating the hammer away from the striking position; and
- wherein, when the cam releases the shaft, the spring biases the shaft to pivot the hammer toward the striking position.

According to another aspect of the invention there is provided a vibration device for a utility pole sensor system comprising:
- a housing adapted to couple to a utility pole;
- a cam configured to vibrate the housing when the cam is in rotation; and
- a motor for rotating the cam, causing the housing to vibrate.

BRIEF DESCRIPTION OF DRAWINGS

Embodiments of the invention will now be described by way of example only with reference to the accompanying drawings, in which.

DESCRIPTION OF EMBODIMENTS

Referring now to FIGS. 1 to 6, a utility pole monitoring system 20, 60 in accordance with some embodiments of the invention, generally comprises a plurality of pole sensing systems 23, 61 each adapted to couple to a utility pole (not shown). Each pole sensor system 23, 61 comprises at least one sensor for sensing a characteristic of utility pole condition. The utility pole monitoring system 20, 60 further comprises a remote device, typically in the form of a server 21, in wireless communication with each pole sensor system 23, 61. Either or both the server 21 and the pole sensor system 23, 61 is configured to analyze the sensed characteristic. Accordingly, the utility pole monitoring system can determine and monitor the condition of each utility pole coupled to a utility pole sensor system 23, 61.

Figure 4:
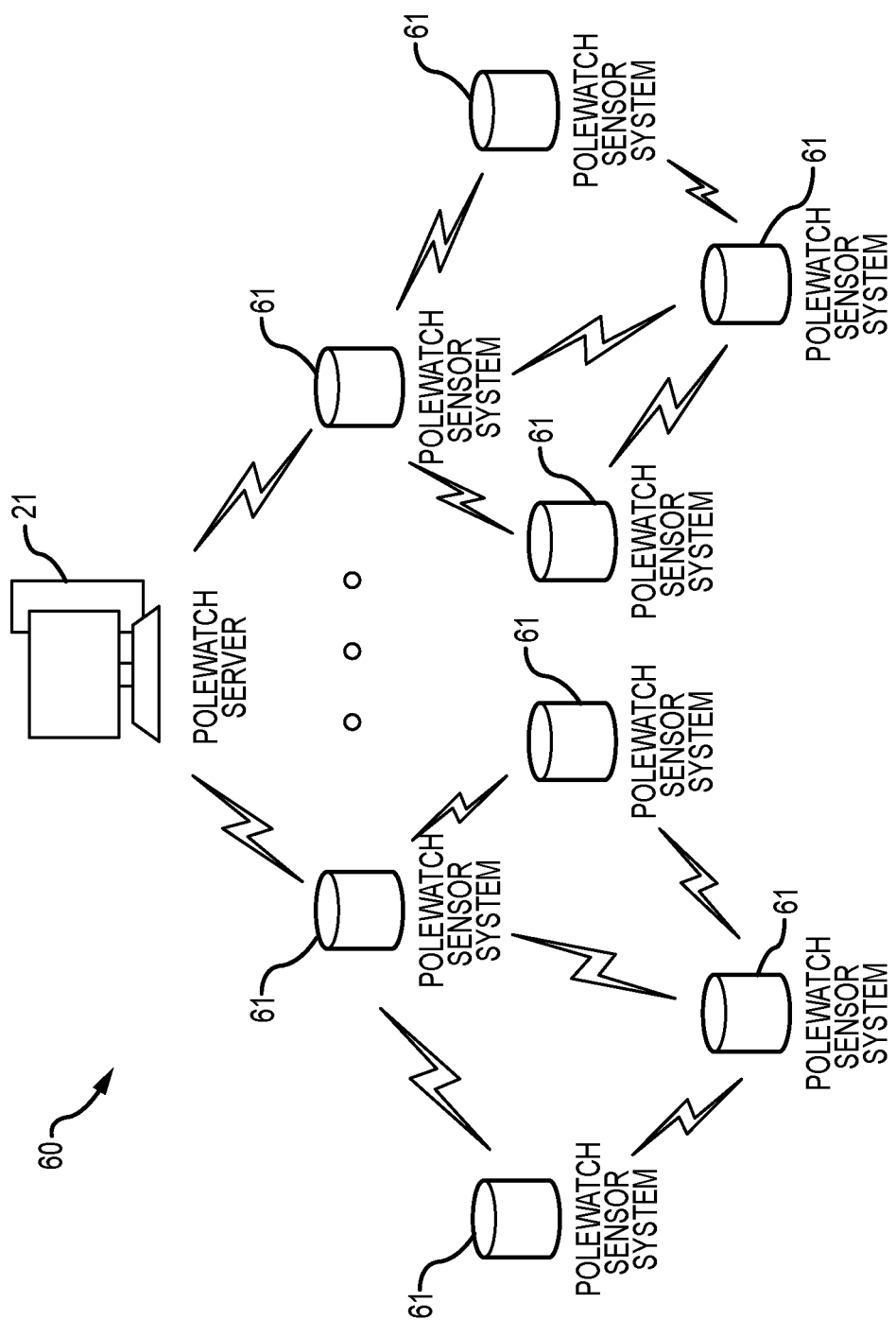
FIG. 4 is a schematic representation of the utility pole monitoring system in accordance with another embodiment.

In some embodiments, for example as shown in FIG. 4, two or more of the plurality of pole sensor systems 61 may be in wireless communication with each other. The network configuration depicted in the example embodiments may be referred to as a wireless mesh network topography. For such a network topography, the server 21 may be in direct wireless communication with any one of the pole sensor systems and may be in wireless communication with further pole sensor systems 61 indirectly through communication between pole sensor systems 61 within the network mesh, relaying communication between the required pole sensor system 61 and the server 21. The server 21 may be a web server. The server 21 may run on a computer 24.

Figure 1:
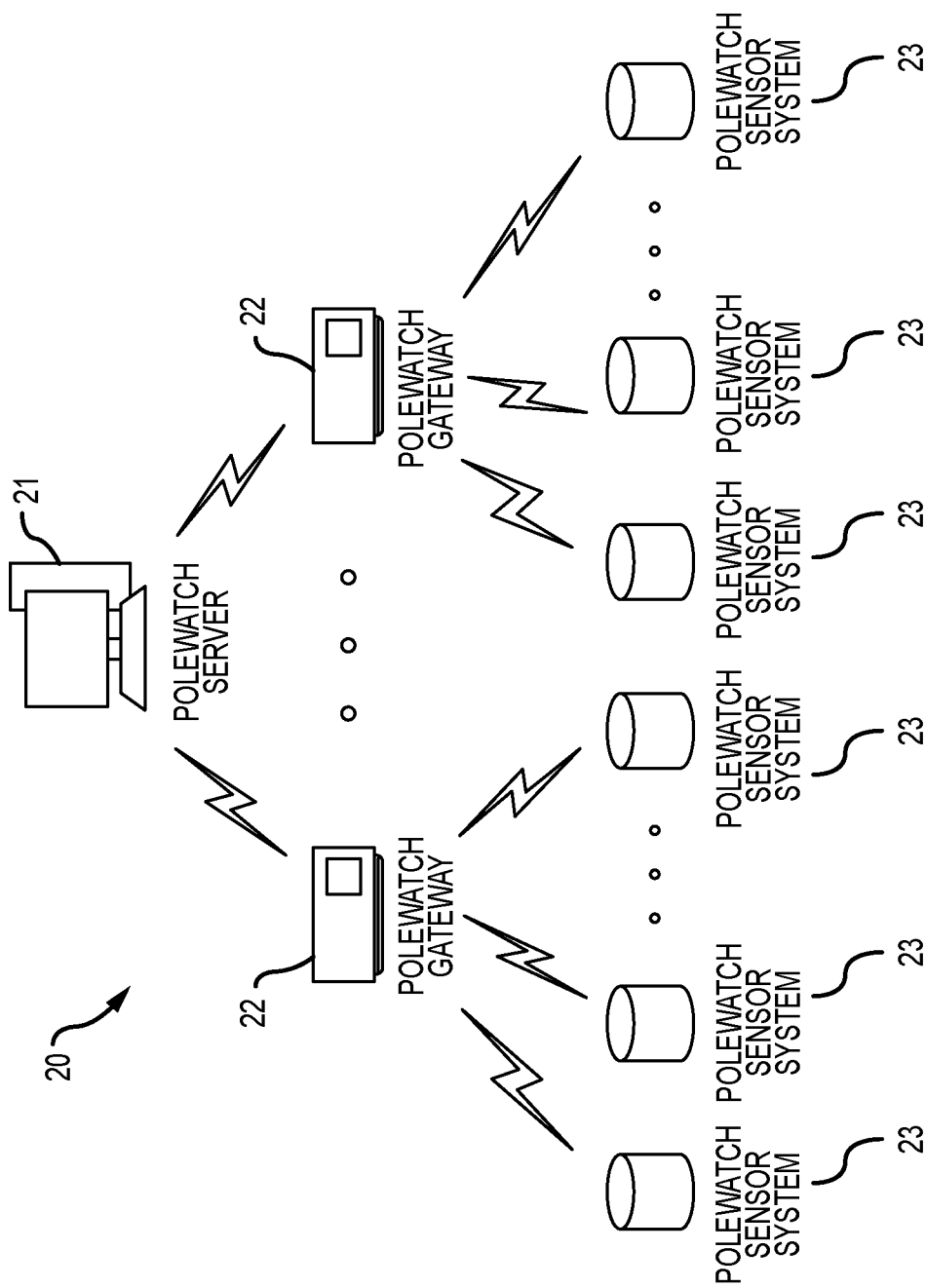
FIG. 1 is a schematic representation of a utility pole monitoring system in accordance with one embodiment.
Figure 2:
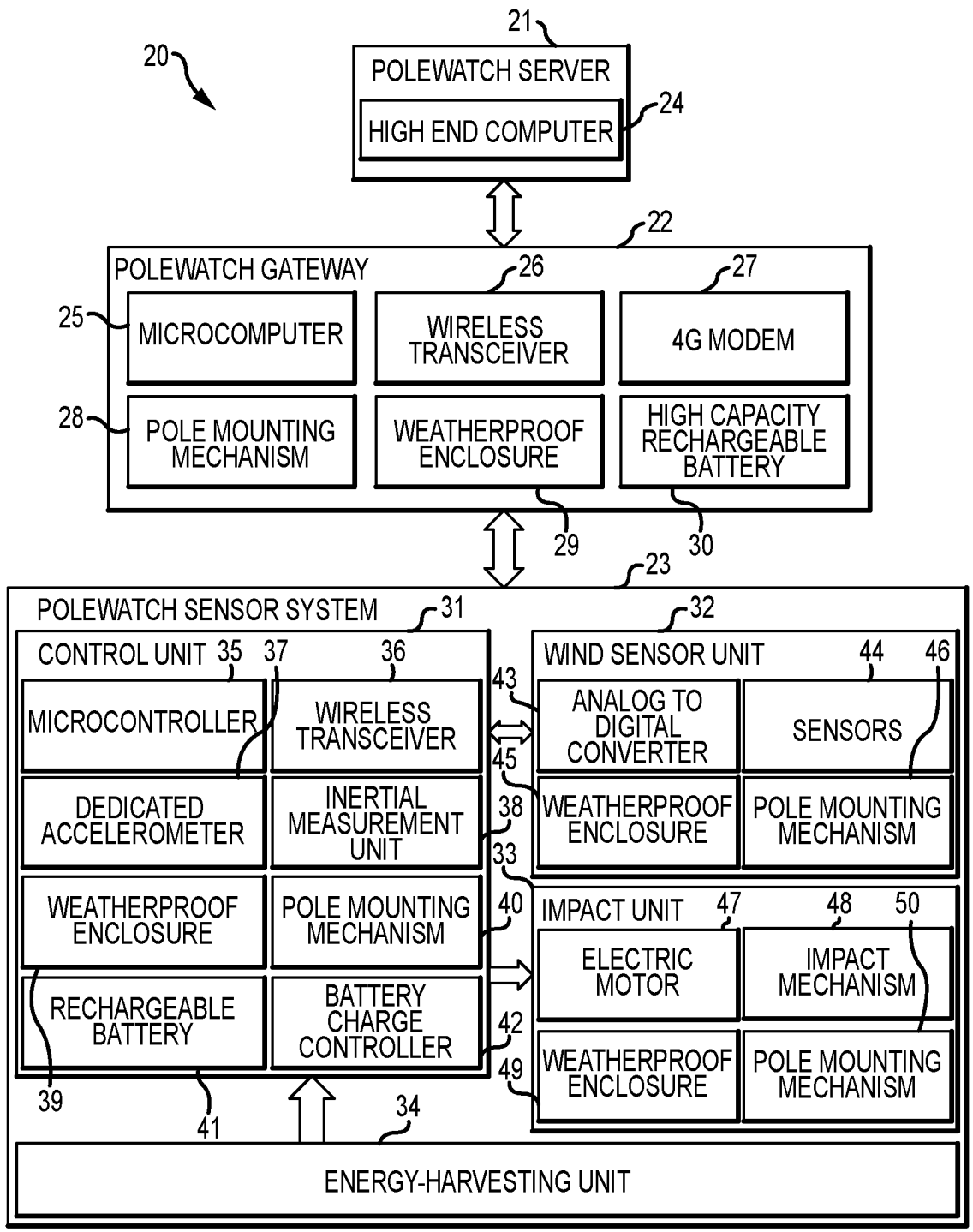
FIG. 2 is a block diagram of the utility pole monitoring system of FIG. 1.

In some embodiments, for example as shown in FIGS. 1 and 2, the utility pole monitoring system 20 may comprise a gateway 22. The server 21 may be in direct wireless communication with the gateway 22 and communicate with each pole sensor system 23 indirectly via the gateway 22. Each pole sensor system 23 may be in direct wireless communication with the gateway 22 only. The network configuration depicted in the example embodiment may be referred to as a star wireless network topography. The gateway may act as a central hub in a local star network. The gateway 22 may communicate with the server 21 over a cellular network which may, for instance, be a 4G network. Each pole sensor system 23 may communicate with the gateway 22 over a Low-Power Wide-Area Network Internet of Things (LPWAN). The LPWAN used may be Long Range Wide Area Network (LoRaWAN).

Referring to FIG. 2, in an example embodiment the gateway 22 may comprise a microcomputer 25 configured to control the gateway 22. The microcomputer 25 may be a single board computer such as a raspberry pi. The gateway may further comprise communications hardware, which may include a wireless transceiver 26 and/or a 4G modem 27. The wireless transceiver 26 may feature an Internet of Things modem which may be a LoRaWAN modem. The transceiver 26 may be configured to provide long range communications while reducing power consumption. The transceiver 26 may be configured to communicate with one or more pole sensor systems 23, whereas the 4G modem 27 may be configured to communicate with the server 21. The 4G modem may comprise a 4G USB dongle including a SIM card. The gateway 22 may be adapted to couple to a utility pole by means of a pole mounting mechanism 28, such as a clamp. The gateway 22 may be housed within a weather proof enclosure 29 to, for instance, shield the gateway and associated electronics from weather elements. The gateway may further comprise a power supply which may take the form of rechargeable battery 30. The battery may be configured to supply the gateway with energy for an extended period, such as 3 to 5 day, for instance. The rechargeable battery 30 may be a lithium ion battery.

The gateway 22 may be configured to receive and process commands such as conducting impulse tests on a specific utility pole. The commands from a webserver together with other communication commands such as retransmission commands are incorporated in invitation packets transmitted to a specific pole sensor system 23. The gateway may transmit packets comprising various commands for different pole sensor systems 23.

In some embodiments, as shown, for example, in FIG. 2, the pole sensor system 23 may comprise a plurality of discrete units that together perform sensing on a utility pole. The pole sensor system 23 may comprise a control unit 31 for controlling the sensor system 23 as well as control interaction between discrete units within the sensor system 23. The pole sensor system 23 may comprise a standalone wind sensor unit 32 for measuring ambient wind conditions in proximity to a utility pole. The pole sensor system 23 may comprise a vibration device configured to generate vibrations on a surface of or within the utility pole. In some embodiments, the vibration device may take the form of a standalone impact unit 33 configured to deliver a repeatable force impulse to a utility pole to generate the vibrations. The pole sensor system may comprise an energy harvesting unit 34, for supplying energy to the pole sensor system 23. The control unit 31 may be connected by one or more cables to each of the standalone wind sensor unit 32, the standalone impact unit 33 and the energy harvesting unit 34. Each discrete unit may be mounted on different locations on or around a utility pole.

The control unit 31 may be configured provide instructions to each of the standalone wind sensor unit 32, the standalone impact unit 33 and the energy harvesting unit 34. The control unit 31 may also be configured to collect data from any unit within the system. The control unit 31 may be configured to manage power consumption and power allocation to each unit within the sensor system 23. The control unit may be configured to manage wireless communication between the sensor system 23 and the gateway 22 as well as data transfer to and from the gateway 22. The control unit 31 may comprise a microcontroller configured to control operation of the pole sensor system 23. The control unit 31 may comprise a sensor system wireless transceiver 36 for transmitting and receiving data. For the embodiment shown, data is transmitted to and from the gateway 22 to the pole sensor system 23. The sensor system wireless transceiver 36 may similar or identical to the wireless transceiver 26 of the gateway 22 as described above. The control unit may comprise an accelerometer 37 configured to detect vibration within a utility pole. The accelerometer 37 may be configured to measure the vibration induced by the force pulse generated by the standalone impact unit 33. The accelerometer 37 may take the form of a piezo-ceramic accelerometer. The control unit 31 may comprise an inertial measurement unit 38 configured to detect deflection angles of a utility pole. The control unit 31 may comprise a control power supply in the form of a control unit battery 41. The control unit battery 41 may be rechargeable and may be configured to supply power to each unit within the pole sensor system 23. The control unit 31 may comprise a battery charge controller 41 for managing transfer of energy from the energy harvesting unit 34 to the control unit battery 41. The control unit 31 may be housed within a control unit weatherproof enclosure 39. The control unit weather proof enclosure 39 may have a pole mounting mechanism 40 for attaching the control unit 31 to a utility pole.

In some embodiments, the standalone wind sensor unit 32 may comprise an analogue to digital converter 43 connected to one or more wind sensors. The wind sensors may be wind pressure sensors 44. The analogue to digital converter 43 and the wind pressure sensors 44 may be housed within a wind sensor weather proof enclosure 45 which is configured to allow wind to act on the pressure sensor, while still shielding other equipment such as the analogue to digital converter 43 from harmful elements such as precipitation.

Figure 7:
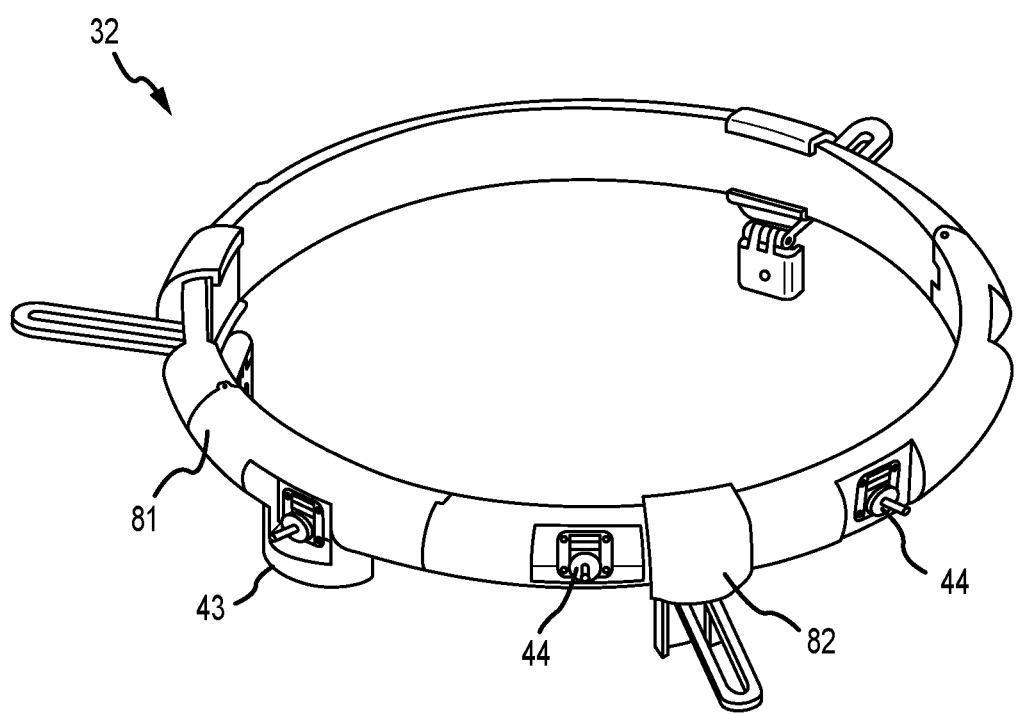
FIG. 7 is a perspective view of a standalone wind sensor unit in accordance with another embodiment.

With reference to FIG. 7 showing an example embodiment of a standalone wind sensor unit 32 comprising a circular waterproof enclosure in the form of a ring body 81. The ring body 81 houses an analogue to digital converter 43 and a plurality wind pressure sensors 44. The wind pressure sensors 44 may be spaced apart around a circumference of the ring body 81, allowing the wind pressure sensors 44 to sense wind. The ring body 81 comprises a plurality of sections, wherein at least two, but preferably 3 of the sections are attached by a hinge allowing the ring body 81 to open, thereby allowing the ring body 81 to engage a utility pole within the ring body 81 and to secure the ring body around a utility pole when closed. The standalone wind sensor unit 32 may comprise clips 82 for securing the ring body 81 to a utility pole. Each of the wind pressure sensors 44 may be wired to the analogue to digital converter 43. The analogue to digital converter 43 may be connected to the control unit 31, or more specifically the microcontroller 45 by means of a high speed bus. The ring body 81 may be constructed from Acrylonitrile Butadiene Styrene (ABS) plastic.

Referring to FIG. 2, the standalone impact unit 33 may comprise an actuator, which may take the form of an electric motor 47. The standalone impact unit further comprises an impact mechanism 48 that is actuated by the electric motor to generate the force impulse. The electric motor 47 and the impact mechanism 48 may be housed within an impact unit weather proof enclosure 49, configured to all the impact mechanism to engage with the utility pole, while shielding other equipment from harmful weather elements.

Figure 9:
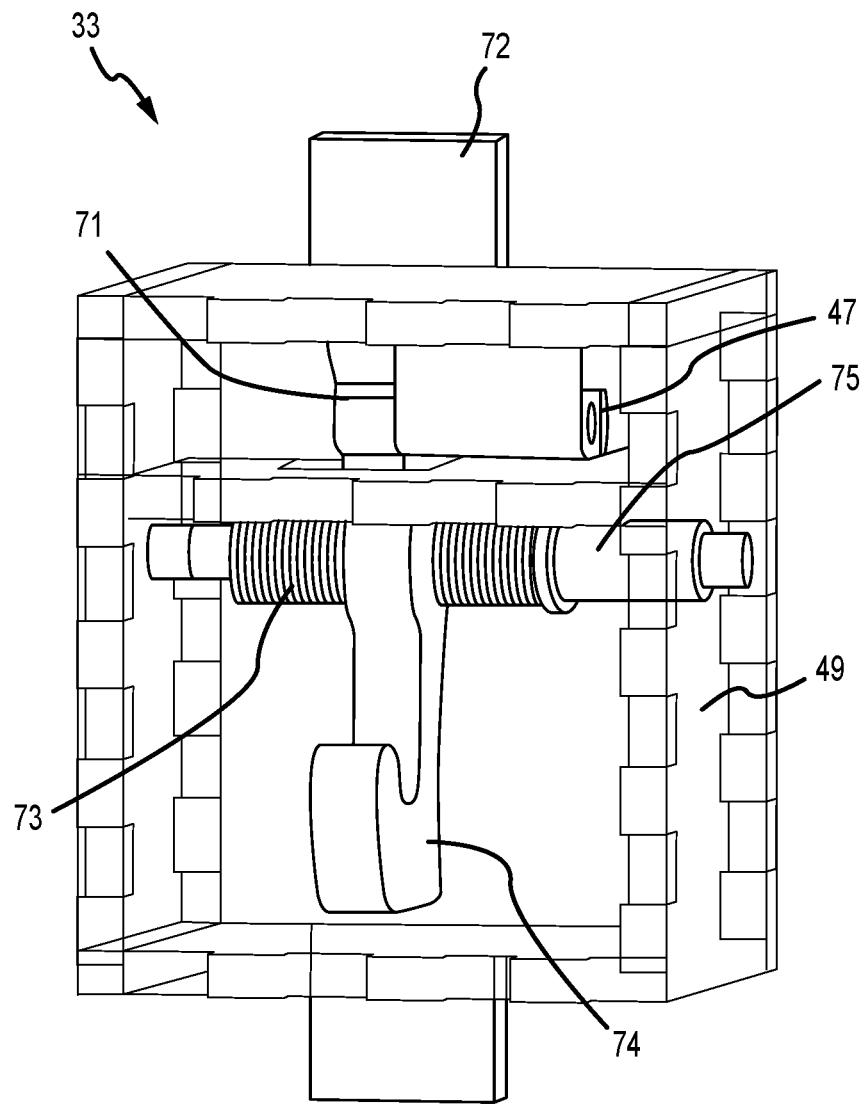
FIG. 9 is a see-through perspective view of a standalone impact unit in accordance with another embodiment.

With reference to FIG. 9, which shows an example embodiment of a standalone impact unit 33 comprising a waterproof enclosure 49 adapted to couple to a utility pole such that there is sufficient contact between faceplate 72 and the utility pole. The waterproof enclosure 49 houses the electric motor 47 and an impact mechanism. The impact mechanism comprises a cam 71 connected to the electric motor 47, a hammer 74 for striking the faceplate 72, a spring 73 for biasing the hammer 74 against the faceplate 72 and a shaft 75 about which the hammer 74 pivots. In operation, when the electric motor 47 actuates the cam 71, the cam 71 causes the shaft 75 to rotate, against the force of the spring 73. The hammer 74 rotates with the shaft 75. When rotation of the cam 71 releases the shaft 75, the spring 73 forces the hammer against the faceplate 72, thereby causing an impact onto the faceplate 72 and a coupled utility pole when in use. In operation, the microcontroller 35 of control unit 31 may send an initialization signal to the electric motor 47 of impact unit 33 to initiate an impact sequence. Changes in measurement of vibrations resulting from an induced impact force may indicate change in condition of the utility pole.

In some embodiments, the vibration device may comprise a non-impact device configured to generate vibrations on or in the utility pole without an impact mechanism. In some embodiments, the non-impact device may comprise a housing adapted to couple to a utility pole. The housing may house a cam, and an actuator, typically in the form of a motor, configured to actuate the cam. The cam may be off-balance, and the off-balance cam may be configured to cause vibration of the housing when actuated by the motor. When the non-impact device is mounted to a utility pole, vibration of the housing is transferred to the utility pole, which can be measured by the sensor to determine a condition of the utility pole, without applying an impact force to the utility pole. The non-impact device may be configured substantially similar to the impact unit, comprising a motor and a cam, wherein rotation of the cam causes the housing to vibrate.

Figure 5:
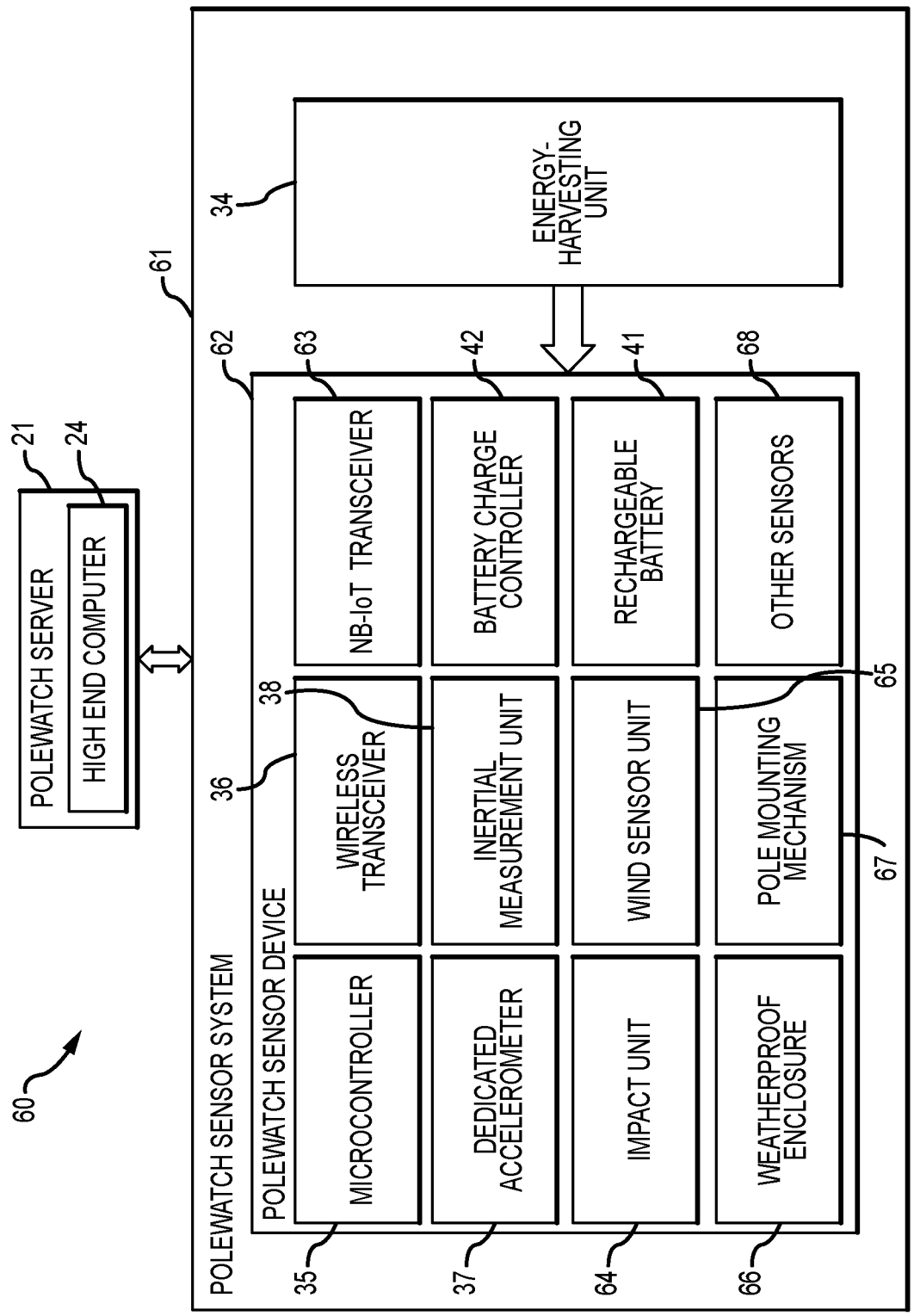
FIG. 5 is a block diagram of the utility pole monitoring system of FIG. 4.

Referring to FIGS. 4 and 5, an example embodiment of utility pole monitoring system 60 comprising a plurality of pole sensor systems 61 is shown. In contrast to the utility pole monitoring system described above with reference to FIGS. 1 and 2, the example embodiment does not comprise a gateway as an intermediate communication device between the server 21 and each pole sensor system 61. A pole sensor system 60 may comprise an integrated utility pole monitoring device also described as a sensor device 62 adapted to couple to a utility pole to perform monitoring of the condition of the coupled utility pole. In contrast to the pole sensor system described above with reference to FIGS. 1 and 2, all sensors and monitoring equipment is contained within a single pole sensor device 62, with no external standalone sensing units.

The pole sensor device 62 may comprise the same units as the control unit 31 described above. The pole sensor device 62 may further comprise a Narrow Band Internet of Things (NB-IoT) transceiver 63 configured to facilitate communication between the pole watch sensor system 61 and the server 21 without communicating through a gateway. The pole sensor device may further comprise an integrated impact unit 64 and an integrated wind sensor unit 65 housed within an integrated weatherproof enclosure 64 together with all other sensors 68.

Other sensor 68 may be wirelessly connected or wired to pole sensor device 62 and may, for example, measure conductor temperature, conductor condition, crossarm condition, insulator condition, transformer temperature, smoke, rainfall, fire, ambient temperature, humidity or electromagnetic radiation.

Figure 8:
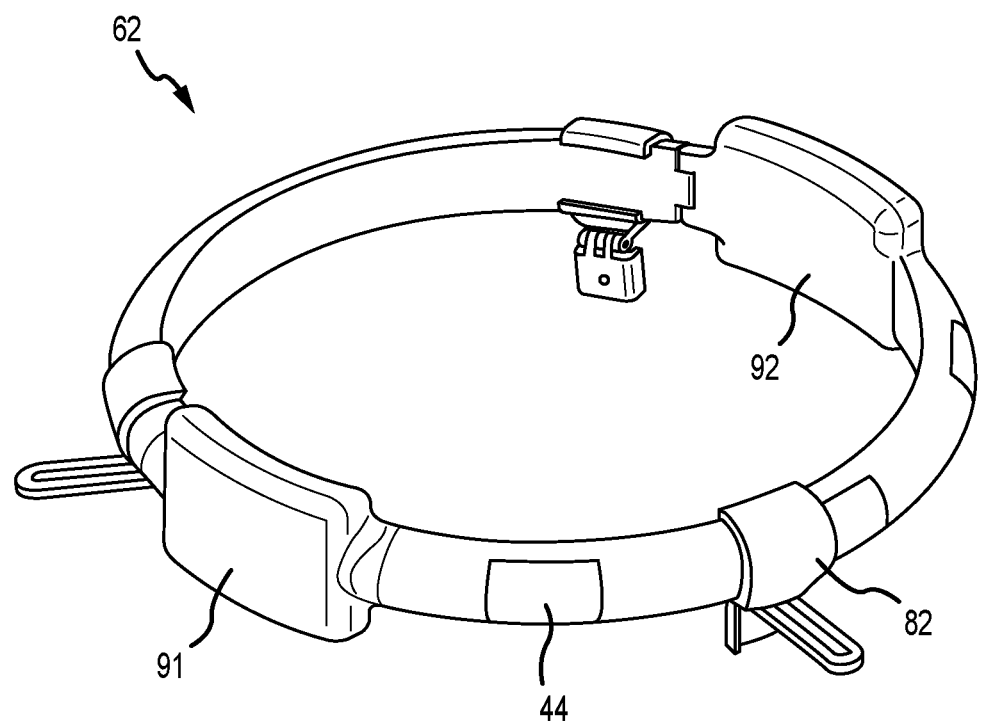
FIG. 8 is a perspective view of a standalone pole sensor device in accordance with another embodiment.

Referring to FIG. 8, an example embodiment of a utility pole sensor device 62 is shown. The utility pole sensor device 60 comprises a body in the form of a ring 90 adapted to couple to a utility pole. The utility pole sensor device 62 comprises an integrated impact unit 92 arranged within the ring 90 in contact with the utility pole when mounted. The utility pole sensor device 62 comprises a control unit 91 comprising an accelerometer (not shown) for measuring vibrations within the utility pole generated by the impact unit 92. The controller is configured to provide an initialization signal to the impact unit, to initiate an impact cycle, and receive measured data from the accelerometer.

The ring 90 may comprise ring sections 90a-90c, wherein one or more of the ring sections are attached by a hinge to allow the ring 90 to hinged open to locate the ring 90 around a utility pole and hinged close to encircle and mount onto the utility pole.

The integrated impact unit 92 may be substantially configured the same as the standalone impact unit 33 described above with reference to FIG. 9.

The utility pole sensor device 62 may further comprise one or more wind sensors 44. The utility pole sensor device may further comprise one or more additional sensors such as, an infrared sensor (not shown), a humidity sensor (not shown), or a temperature sensor (not shown) in accordance with further requirements.

Figure 3:
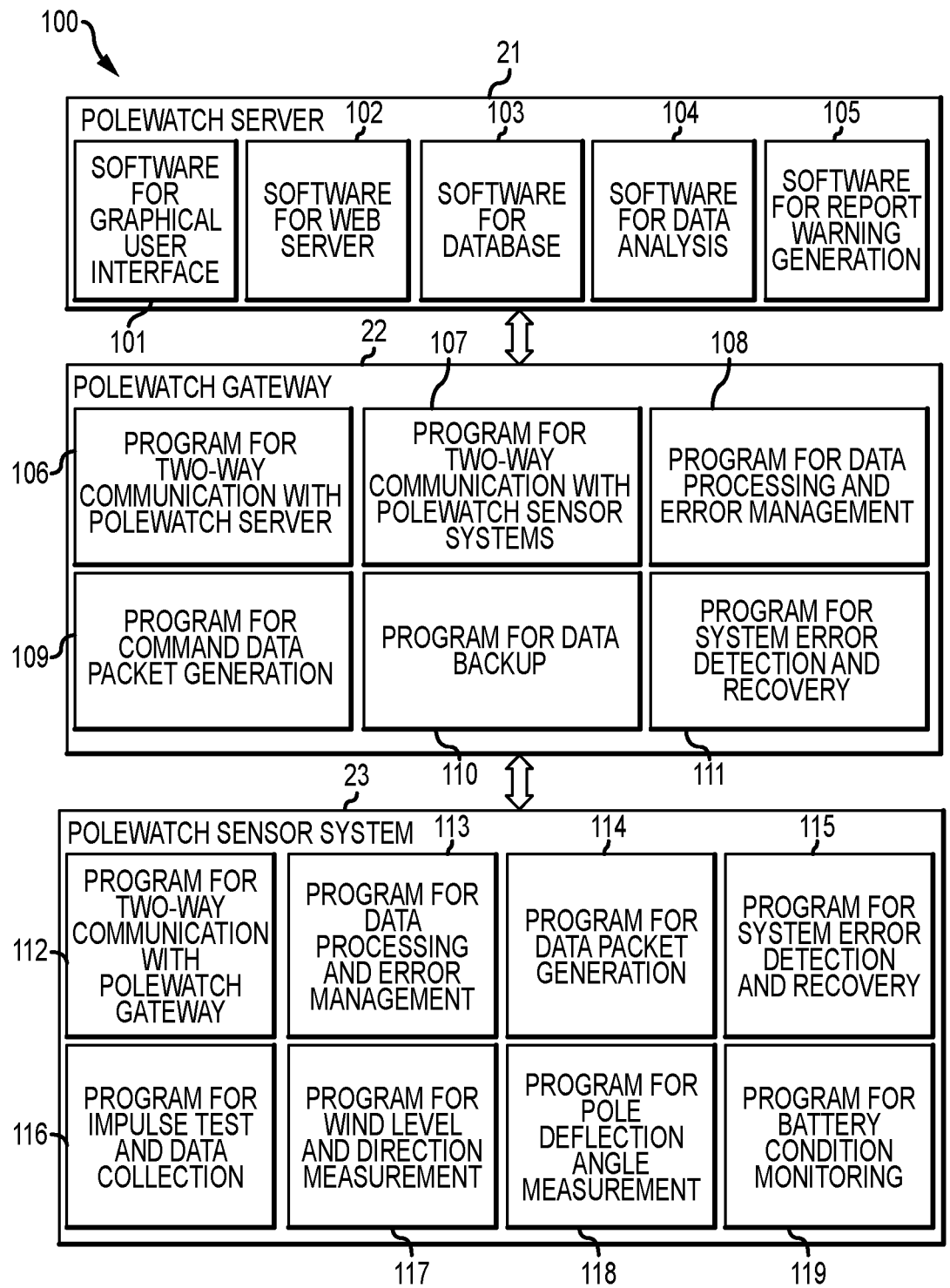
FIG. 3 is a block diagram of programs executed within the utility pole monitoring system of FIG. 1.
Figure 6:
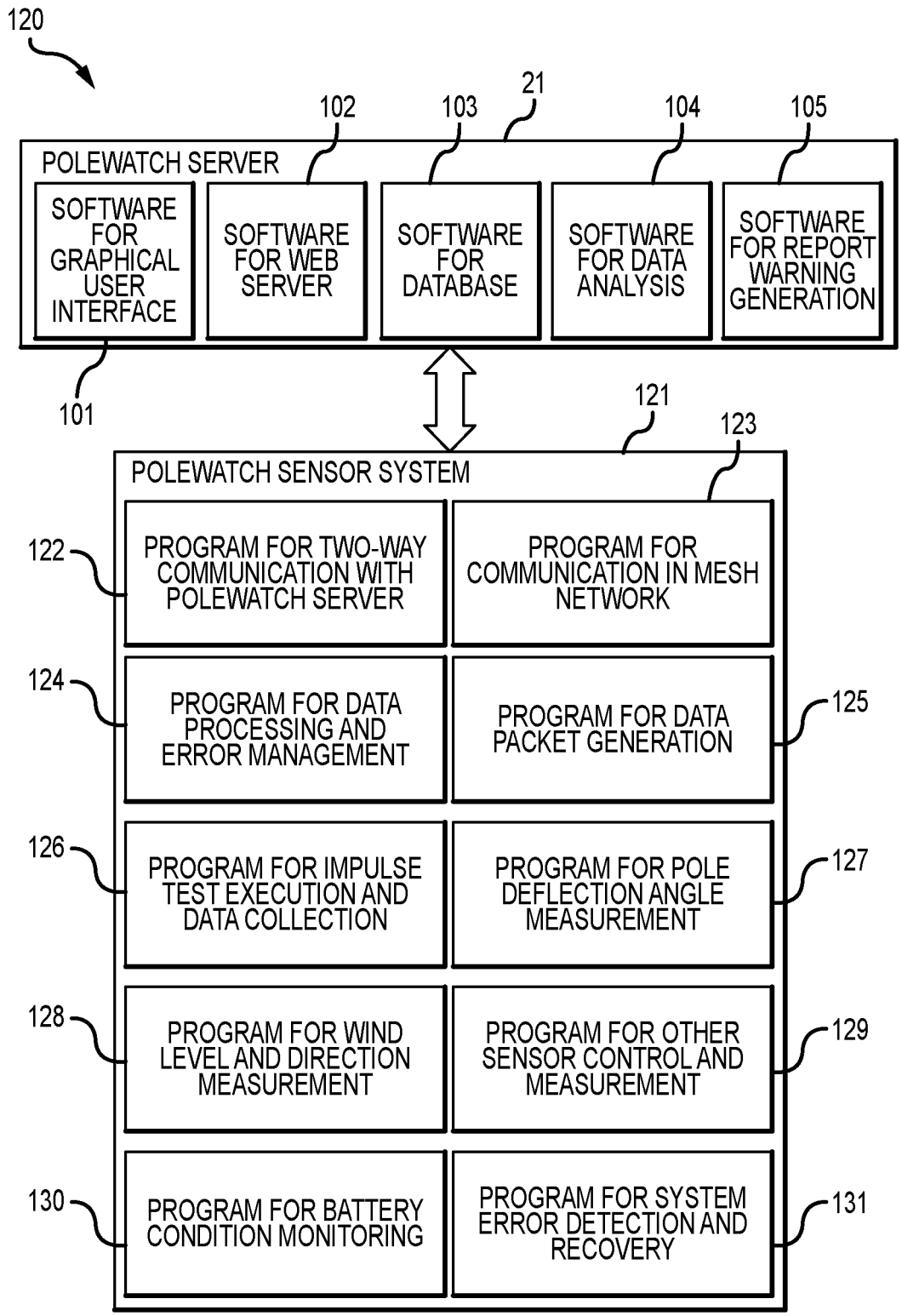
FIG. 6 is a block diagram of programs executed within the utility pole monitoring system of FIG. 4.

In example embodiments of utility pole monitoring systems 100, 120 shown in FIGS. 3 and 6, the server 21 may be configured to execute software providing a graphic user interface (GUI) 101 which may comprise a geographic information system (GIS) mapping service. The GUI 101 may display real-time pole structural and ambient environmental condition measure in relation to each utility pole. The GIS mapping service may be configured display information relating to the location of each Sensor system 23. The server 21 may further be configured to execute software to run a web server 102. The web server may be configured to transfer data and commands between one or more gateways 22 and a database 103. The database 103 may be configured to store and control data collected from each pole sensor system 23, 61. The server 21 may further be configured to execute software for data analysis and algorithms 104, to, for instance, determine the condition of a utility pole based on a measured characteristic. The server may further be configured to execute software generating reports or warnings such as alarms 105 generated based on a change in condition of a utility pole, for example.

In an example embodiment, as shown, for instance, in FIG. 3, the gateway 22 may be configured to execute a number of programs to perform functions associated with the gateway 22. The gateway 22 may be configured to execute a program for two-way communication with the server 106. The program for two-way communication with the server 106 may be configured to facilitate communication over a 4G network. The gateway 22 may be configured to execute a program for two way communication with pole sensor systems 107. The program for two way communication with pole sensor systems 107 may be configured to facilitate communication over the LPWAN. The gateway 22 may be configured to perform data processing on information received from the pole sensor system 23. The gateway 22 may further be configured to perform error management in relation to data received from a pole sensor system 23. Data handling and error management may be performed by a program for data processing and error management 108. The gateway 22 may be configured to execute a program for command or data packet generation 109. The program for command or data packet generation 109 may manage communication between the gateway 22 and a plurality of pole sensor systems 23. The gateway may further be configured to back up data received by the gateway 22 from the pole sensor systems 23 and/or the server 21. The gateway may be configured to perform system error detection and recovery, to detect system errors within the utility pole monitoring system 20. The gateway 22 may be configured to execute a program for system error detection and recovery 111 to manage events such as system errors.

In an example embodiment, as shown, for instance in FIG. 3, the pole sensor system 23 may be configured to execute a number of programs to perform functions associate with the pole sensor system 23. The pole sensor system 23 may be configured to execute a program enabling two-way communication with the gateway 112. The sensor system may be configured to perform data processing on data generated by a sensor or data received from the gateway 22. The pole sensor system 23 may further be configured to perform error management in relation to data generated or data received from the gateway 22. Data handling and error management may be performed by a program for data processing and error management 113. The pole sensor system may be configured to execute a program for data packet generation 114. The program for data packet generation 114 may manage communication between the pole sensor system 23 and the gateway 22. The pole sensor system 23 may be configured to perform system error detection and recovery, to detect system and measurement errors within the pole sensor system 23. The pole sensor system 23 may be configured to execute a program for system error detection and recovery 115 to manage events such as system errors. The pole sensor system 23 may be configured to execute a program for impulse test execution and data collection 117 initiating the process of actuating the impulse mechanism and measuring the resulting vibration. The pole sensor system 23 may be configured to execute a program for wind level and direction measurement 117 to measure wind characteristics by means of the wind sensor unit. The pole sensor system 23 may be configured to execute a program for pole deflection angle measurement 118 to measure the pole deflection using one or more of sensed gyroscope, magnetometer or accelerometer measurements. The pole sensor system 23 may be configured to execute a program for battery condition monitoring to monitor the charge of the battery 41 of control unit 31.

In an example embodiment, as shown, for instance in FIG. 6, the pole sensor system 121 may further execute a program for communication in a mesh network 123 enabling the pole sensor system to communicate indirectly with the server 21 by transmitting to another pole sensor system 121.

Figure 10:
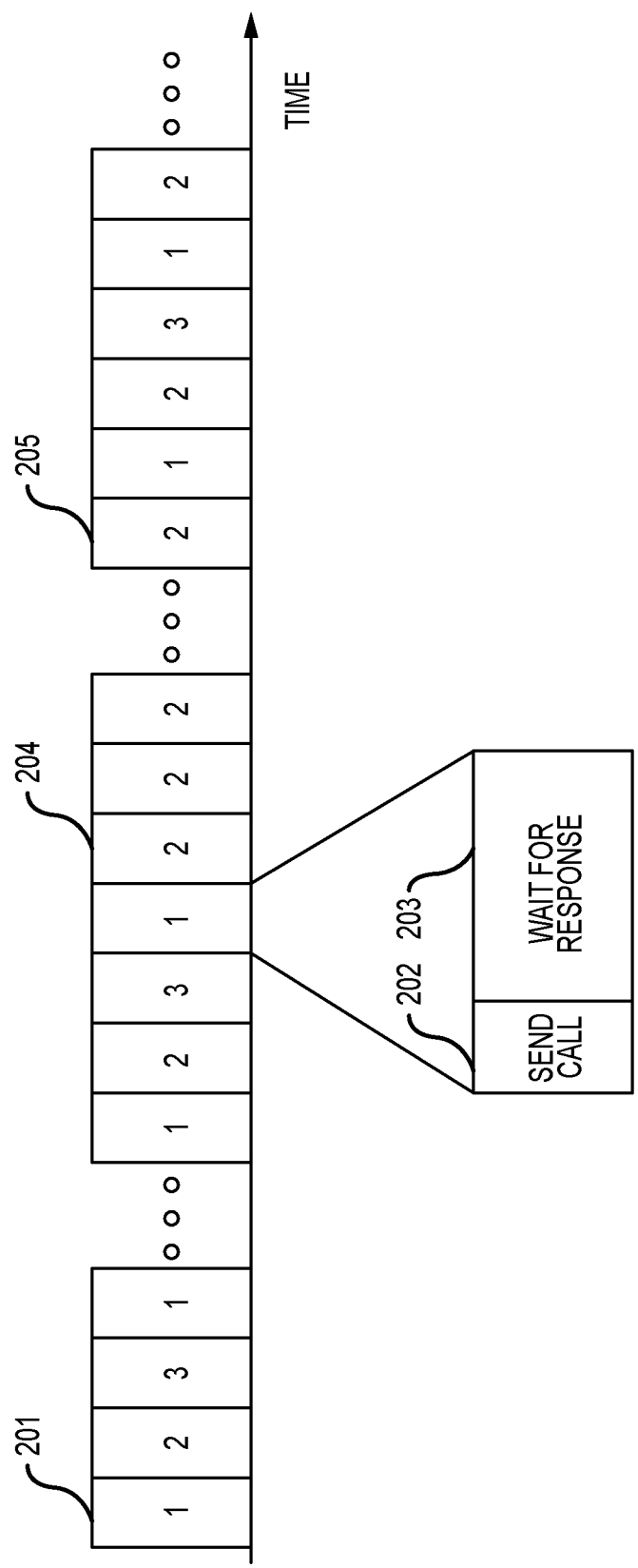
FIG. 10 is a time-sequence diagram of communication process of the utility pole monitoring system of FIG. 1.

Each pole sensor system 23, 61 and/or gateway 22 within a utility pole monitoring system 20, 60 may be assigned a unique identifier which may be a unique numerical identifier or a media access control address (MAC address). The unique identifier may be used to establish communication between the systems 23, 61 and/or a gateway 22 using a channel access method. With reference to FIG. 10, for an example embodiment, to allow multiple pole sensor systems to be addressed on the same frequency (for example 915 MHz for Lora in Australia) the same frequency is shared by dividing the signal into different time slots 201. In each time slot, the gateway 22 is configured to send an invitation 202 to a pole sensor system and wait for a response 203 until timeout. Each address is allocated a timeslot and each address is sequentially invited to communicate according to the sequence. This process will keep repeating to every pole sensor system 23 in the network and go back to the first pole sensor system once all the other sensor systems 23 have been called. The process is terminated when one system gives a response within its allocated time slot. From the next time slot, the gateway will keep sending invitations to communicate with the system that responded until data transfer between the system 23 and the gateway 22 is completed or a pre-set communication timeout is reached. After completion or timeout, the sequence of polling each address is resumed.

Figure 11:
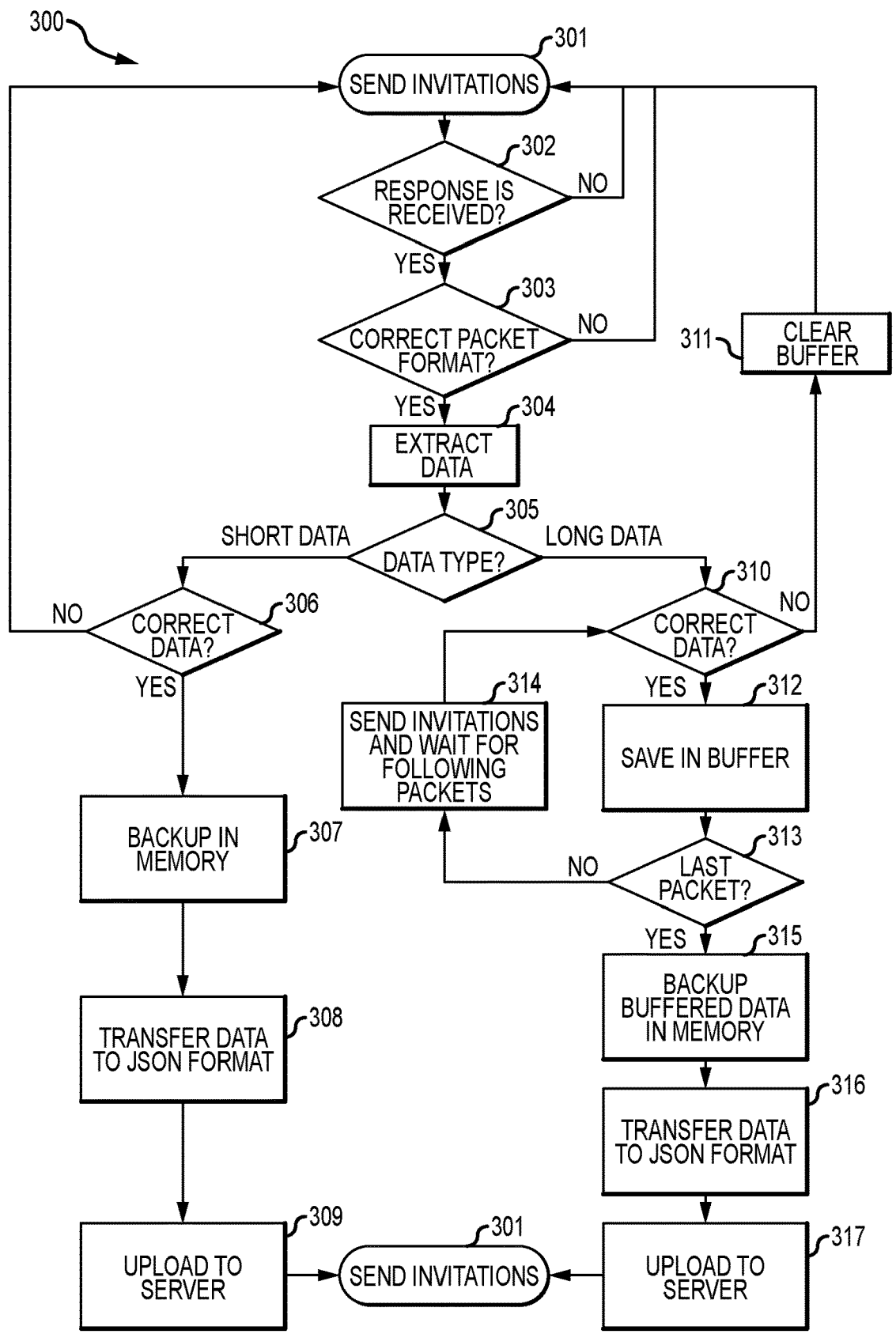
FIG. 11 is a flow diagram of data processing and uploading for the utility pole monitoring system of FIG. 1.

In some embodiments, two main types of data configured to be uploaded to the server 21 comprises: short data which could be put into a single packet such as wind information and battery conditions. Or alternatively long data which must be carried by a series of packets such as impulse test data. The gateway may be configured to collect and process data form each sensor system 23. In an example embodiment, a data processing and uploading procedure 300 for the gateway 22 is shown in FIG. 11. The gateway 22 is configured to send invitations to every pole sensor system 23 in the local network one by one. If a response is received, packet format is checked first 303. If the format is correct, data in the packet is extracted 304, otherwise the packet will be discarded and the gateway 22 will resume sending invitations. Various types of data is processed in different procedures according to numerical data type identifiers in the packets.

For short data, certain data values are checked according to the data type 306. For example, the battery voltage levels must be less than 4.5V when 1 cell lipo batteries are applied to the pole sensor system 23. If the data is detected as incorrect, the packet is discarded and the program sends invitations with transmissions commands to the system 23. If all the data in the packet is correct, it is backed up together with comments including date, time and data types into the memory of a microcomputer 307. The data is then transferred to JavaScript Object Notation (JSON) format to comply with a requirement of the webserver's programming interface (API) 308 and uploaded to the server 309.

For long data, certain data values in one packet will similarly be checked according to the data type 310. If the data is correct, a buffer is utilized to save the data temporarily 312. Afterwards fragflag and offset in a packet are used for long data fragmentation and reassembly and checked to ensure the packet is the last in a sequence of the long data. If not, the gateway 22 will continue to send invitations to communicate to the sensor system 23 and wait for additional packets 314. Every time a new packet is received, it will be checked. Once wrong data is detected, the program will clear the buffer 311 and send invitation with transmission commands to the system 23. If all the data is acquired, it will be backed up from the buffer together with comments including date, time, and data types into the memory of the microcomputer 315, transferred to JSON format and uploaded to the server 317. Afterwards the gateway will again resume polling all the systems 301.

Figure 12:
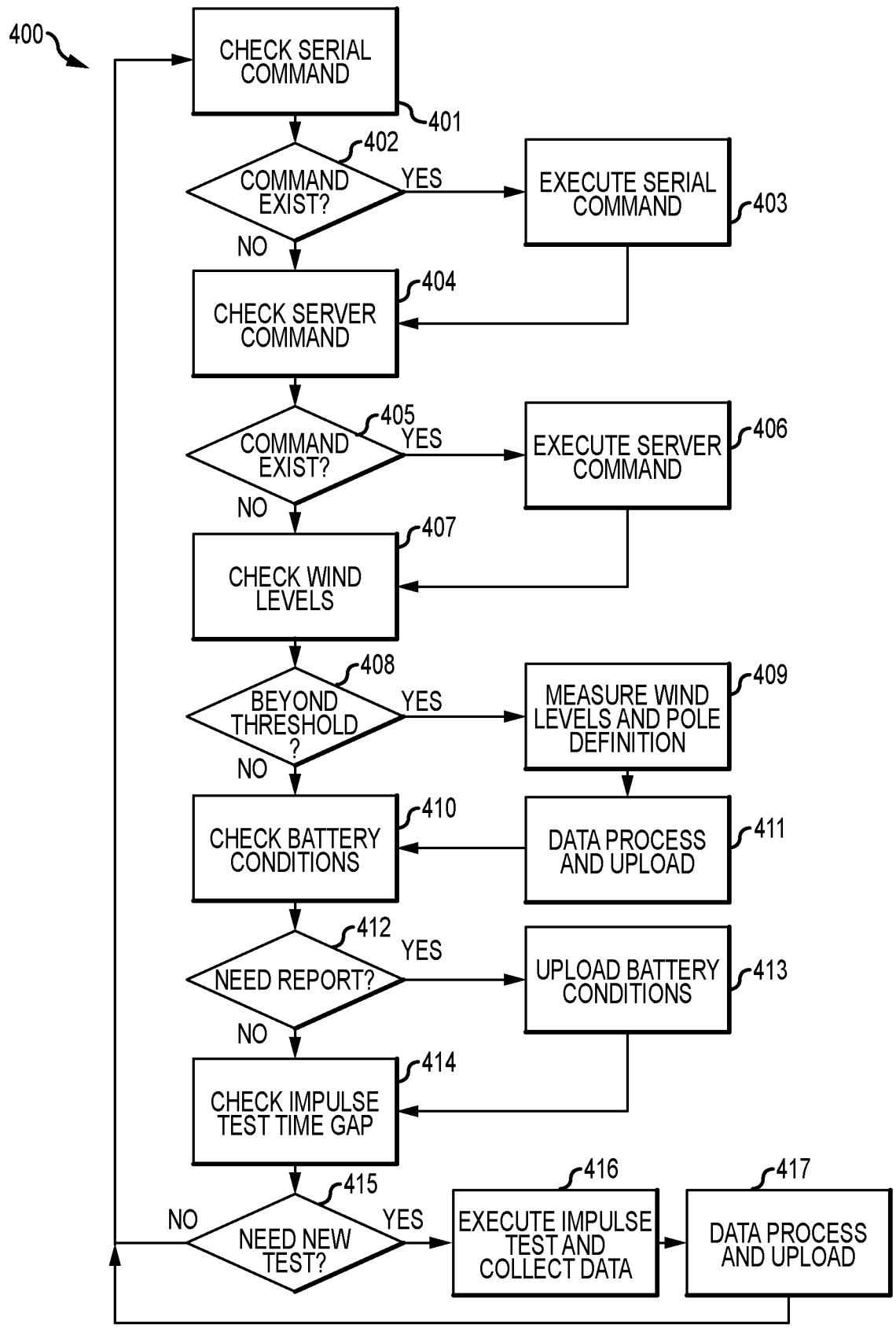
FIG. 12 is a flow diagram of a main event loop on a pole sensing device.

FIG. 12 shows an example main event loop 400 of firmware on a pole sensor system 23. At 401 the program checks whether there is a command from the serial port, a function used by system developers. If a valid command such as motor test is present, it is executed at block 403. At 404 the system then checks whether a command has been issued by server 21. If so, at 406 the sensor system 23 complies with the command, for instance, executing an impulse test. At 407 Wind levels are monitored by means of the wind sensor unit. If a measured peak wind level value exceeds a pre-set threshold, both wind levels a pole deflection angles are measure, processed, and uploaded 409, 411. Next, at 410 the system battery condition is checked. If necessary, at 413 battery condition is uploaded. Finally, at 414 time since last impulse test is reviewed to see if a new test is needed. If required, at 416 an impulse test is executed and the collected data is processed and uploaded at 417. After the sequence is completed, the system goes back to check whether a serial command or a server command has been received 401, 404.

Figure 13:
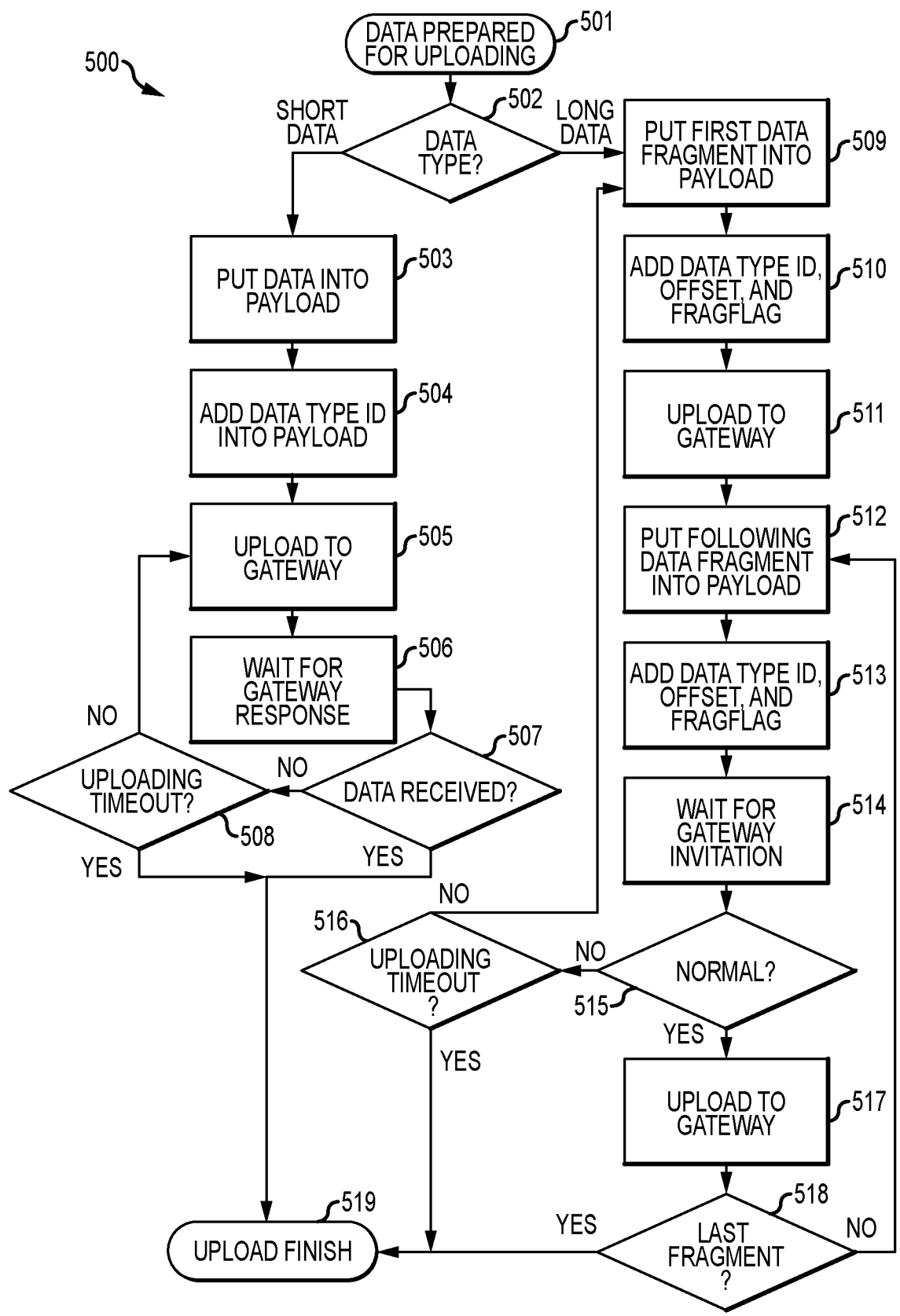
FIG. 13 is a flow diagram of a data uploading process on a pole monitoring device.

FIG. 13 shows an example flow diagram for an upload data from a sensor system 23 to a gateway 22. At 501 and 502 data to be uploaded is checked to see if it is long data or short data. For short data, such as batter conditions and wind levels, the sensor system 23 is configured to generate a single packet comprising all the data and a data type identifier. The data type identifier is used by the gateway to recognize the type of data in the payload 503, 504. After receiving an invitation form the gateway 22 at 505 the sensor system 23 uploads the packet to the gateway 22 and waits for a response from the gateway 506. Once the next invitation is acquired, the response included in the invitation can be read. If the response shows that the data has been received and processed by the gateway, the uploading process for short data is terminated. Otherwise, the sensor system 23 continues to retransmit the packet until the gateway 22 provides confirmation or a pre-set uploading time out is reached.

For long data, such as impulse test samples, the sensor system is configured to at 509 to generate a series of packets comprising fragments of the data, data type identifiers, offsets configured to show whether the packet is the last one, and fragflags configured to show the order of the fragments 510 and 513. Except for the first packet, before uploading a certain packet, the sensor system checks the response in the invitation 514. If the response shows that all the previous data has been received and processed by the gateway 22, the next packet will be uploaded 517. Otherwise, the system will retransmit the data from the previous fragment. The sensor system 23 will keep preparing and uploading data fragments until all the data is uploaded or a preset uploading timeout period is reached.

Embodiments of the present invention provide utility pole monitoring systems that are useful for monitoring utility poles in real-time, thereby avoiding the need for on-site inspection of utility poles.

For the purpose of this specification, the word "comprising" means "including but not limited to", and the word "comprises" has a corresponding meaning.

The above embodiments have been described by way of example only and modifications are possible within the scope of the claims that follow.

The invention claimed is:

1. A utility pole monitoring system, comprising:
a utility pole monitoring device, comprising:
a ring body adapted to mount to a utility pole;
an impact unit integrated with the ring body and configured to generate vibrations within the utility pole by delivering an impact force to the utility pole;
a vibration sensor arranged on the body for measuring the vibrations within the utility pole generated by the impact unit;
a wind sensor arranged on the body for measuring ambient wind conditions in proximity to the utility pole;
a controller for providing an initialization signal to the impact unit, and for receiving and wirelessly communicating measured data from the vibration sensor and the wind sensor; and
a plurality of clips configured with the ring body, the clips being operable to secure the ring body to the utility pole,
wherein the ring body comprises a first ring section and a second ring section attached by a hinge to the first ring section, and
wherein the first and second ring sections are operable to hinge open to locate the ring body around the utility pole and to hinge closed to surround the utility pole.

2. The utility pole monitoring system of claim 1, further comprising:
a plurality of utility pole monitoring devices, each mounted to a respective utility pole, each utility pole monitoring device comprising a sensor for sensing a characteristic of the respective utility pole condition; and
a server in wireless communication with the plurality of utility pole monitoring devices, wherein the server is configured to analyze the sensed characteristic from the plurality of utility pole monitoring devices to determine the condition of the plurality of utility poles.

3. The utility pole monitoring system of claim 1, wherein:
the ring body comprises a weatherproof enclosure; and
the impact unit, the vibration sensor, the wind sensor, and the controller are configured within the weatherproof enclosure.

* * * * *